(12) United States Patent
Kreit

(10) Patent No.: US 7,205,775 B2
(45) Date of Patent: Apr. 17, 2007

(54) SENSING APPARATUS AND METHOD

(75) Inventor: Darran Kreit, Foxton (GB)

(73) Assignee: Sensopad Limited (GB)

( * ) Notice: Subject to any disclaimer, the term of this patent is extended or adjusted under 35 U.S.C. 154(b) by 0 days.

(21) Appl. No.: 10/545,742

(22) PCT Filed: Feb. 17, 2004

(86) PCT No.: PCT/GB2004/000597

§ 371 (c)(1),
(2), (4) Date: Jun. 19, 2006

(87) PCT Pub. No.: WO2004/072653

PCT Pub. Date: Aug. 26, 2004

(65) Prior Publication Data

US 2006/0244464 A1  Nov. 2, 2006

(30) Foreign Application Priority Data

Feb. 17, 2003 (GB) .................................. 0303627.4

(51) Int. Cl.
*G01R 27/28* (2006.01)
*G01R 33/12* (2006.01)
(52) U.S. Cl. .................... 324/654; 324/655; 324/228
(58) Field of Classification Search ................ 324/654, 324/655, 228
See application file for complete search history.

(56) References Cited

U.S. PATENT DOCUMENTS

| 3,275,938 | A | 9/1966 | Carsello et al. |
| 3,772,587 | A | 11/1973 | Farrand et al. |
| 3,789,393 | A | 1/1974 | Tripp |

(Continued)

FOREIGN PATENT DOCUMENTS

DE  4230950  9/1993

(Continued)

OTHER PUBLICATIONS

Howard et al., "Sensing Position", Mar. 27, 2001, Publisher: Appliance Manufacturer.

(Continued)

*Primary Examiner*—Andrew H. Hirshfeld
*Assistant Examiner*—Amy He
(74) *Attorney, Agent, or Firm*—Fogg & Powers LLC

(57) ABSTRACT

There is described an inductive sensor for sensing a parameter such as position. The inductive sensor includes: receive aerial which is electro-magnetically coupled to a magnetic field generator via a resonant circuit with the electromagnetic coupling varying in dependence upon the sensed parameter so that a sense signal induced in the receive aerial is representative of the sensed parameter. The magnetic field generator generates a magnetic field including a first magnetic field component at a first frequency which is operable to induce resonance in the resonant circuit and a second magnetic field component at a second frequency which is not operable to induce resonance in the resonant circuit. The signal processor processes the sense signal to generate a signal component corresponding to a first component of the sense signal at the first frequency adjusted using a second component of the sense signal at the second frequency so that a noise component of the first component of the sense signal is reduced, and determines a value representative of the sensed parameter using the signal component.

16 Claims, 7 Drawing Sheets

U.S. PATENT DOCUMENTS

| | | | |
|---|---|---|---|
| 3,819,025 A | 6/1974 | Fushida et al. | |
| 4,253,079 A | 2/1981 | Brosh | |
| 4,282,485 A | 8/1981 | Pauwels et al. | |
| 4,467,320 A | 8/1984 | McPhee | |
| 4,671,116 A | 6/1987 | Glennon et al. | |
| 4,697,144 A | 9/1987 | Howbrook | |
| 4,737,698 A | 4/1988 | McMullin et al. | |
| 4,793,302 A | 12/1988 | Osborne et al. | |
| 4,853,666 A | 8/1989 | Fesenmeier et al. | |
| 4,893,077 A | 1/1990 | Auchterlonie | |
| 4,893,078 A | 1/1990 | Auchterlonie | |
| 4,959,631 A | 9/1990 | Hasegawa et al. | |
| 4,970,450 A | 11/1990 | Karl et al. | |
| 5,023,408 A | 6/1991 | Murakami et al. | |
| 5,173,696 A | 12/1992 | Howard et al. | |
| 5,260,650 A | 11/1993 | Schwesig et al. | |
| 5,433,115 A | 7/1995 | Spillman, Jr. et al. | |
| 5,513,913 A | 5/1996 | Ball et al. | |
| 5,598,153 A | 1/1997 | Brasseur et al. | |
| 5,625,327 A | 4/1997 | Carroll et al. | |
| 5,646,496 A | 7/1997 | Woodland et al. | |
| 5,793,202 A | 8/1998 | Ikemoto | |
| 5,793,204 A | 8/1998 | Logue | |
| 5,796,250 A | 8/1998 | Dames | |
| 5,815,091 A | 9/1998 | Dames et al. | |
| 6,124,708 A | 9/2000 | Dames | |
| 6,239,571 B1 | 5/2001 | Shimahara | |
| 6,304,014 B1 | 10/2001 | England et al. | |
| 6,489,899 B1 * | 12/2002 | Ely et al. | 341/20 |
| 2002/0097807 A1 | 7/2002 | Gerrits | |
| 2002/0121988 A1 | 9/2002 | Lonsdale et al. | |
| 2005/0030010 A1 * | 2/2005 | Jones et al. | 324/207.24 |

FOREIGN PATENT DOCUMENTS

| | | |
|---|---|---|
| EP | 0487730 | 6/1992 |
| EP | 0748054 | 12/1996 |
| EP | 0772025 | 5/1997 |
| EP | 1308697 | 5/2003 |
| GB | 2021273 | 11/1979 |
| GB | 2044461 | 10/1980 |
| GB | 2197078 | 5/1988 |
| GB | 2359139 | 8/2001 |
| GB | 2 374 424 | 10/2002 |
| GB | 2374424 | 10/2002 |
| JP | 57122311 | 7/1982 |
| JP | 59205821 | 11/1984 |
| JP | 63218819 | 9/1988 |
| SU | 1458946 | 2/1989 |
| WO | 9800921 | 1/1998 |
| WO | 9843046 | 10/1998 |
| WO | 9934171 | 7/1999 |
| WO | 9961868 | 12/1999 |
| WO | 0033244 | 6/2000 |
| WO | 0077480 | 12/2000 |
| WO | 0129759 | 4/2001 |
| WO | 0142865 | 6/2001 |
| WO | 02097374 | 12/2002 |
| WO | 03038379 | 5/2003 |
| WO | 03038380 | 5/2003 |
| WO | 2004020936 | 3/2004 |
| WO | 200403148 | 4/2004 |
| WO | 2004036147 | 4/2004 |
| WO | 2004067159 | 8/2004 |

OTHER PUBLICATIONS

Howard, "Innovative Interfaces", Oct. 26, 2001, Publisher: Appliance Manufacturer.

Novacek, "Accurate Linear Measurement Using LVDTS", "Circuit Cellar the Computer Applications Journal", May 1, 1999, pp. 1-6, vol. 106, Publisher: Circuit Cellar.

* cited by examiner

SENSING APPARATUS AND METHOD

This application claims priority to International Patent Application No. PCT/GB04/000597 filed on Feb. 17, 2004, which claims priority to GB Patent Application No. 0303627.4 filed on Feb. 17, 2003 in Great Britain.

This invention relates to a method of sensing the position or the speed of an object, and an apparatus therefor. The invention has particular relevance to inductive sensors in which a magnetic field induces a signal in a resonant circuit.

BACKGROUND OF THE INVENTION

UK Patent Application GB 23744A describes an inductive position sensor in which a transmit aerial and a receive aerial are formed on a first member, and a resonant circuit having an associated resonant frequency is formed on a second member which is movable relative to the first member. An excitation signal having a frequency component at or near the resonant frequency of the resonant circuit is applied to the transmit aerial resulting in the generation of a magnetic field having a magnetic field component at or near the resonant frequency of the resonant circuit. The generated magnetic field induces a resonant signal in the resonant circuit, which in turn induces a sense signal in the receive aerial that varies with the relative position of the first and second members. The sense signal is processed to determine a value representative of the relative position of the first and second members.

In the position sensor described in GB 2374424A, the resonant signal induced in the resonant circuit is generated as a result of an electromotive force which is proportional to the rate of change of the magnetic field component at or near the resonant frequency. As the impedance of the resonant circuit is substantially entirely real at the resonant frequency, the resonant signal is approximately in phase with the electromotive force and accordingly is approximately 90° out of phase with the frequency component of the excitation signal near the resonant frequency. The sense signal induced in the receive aerial is generally in phase with the resonant signal, and therefore the sense signal is also approximately 90° out of phase with the component of the excitation signal near the resonant frequency of the resonant circuit.

The sense signal is synchronously detected using a signal which has the same frequency as, but is in phase quadrature with, the frequency component of the excitation signal near the resonant frequency of the resonant circuit. By using such phase sensitive detection, noise which is at the same frequency as, and is in phase with, the frequency component of the excitation signal near the resonant frequency of the resonant circuit is substantially removed along with noise at frequencies away from the resonant frequency.

A problem with such an inductive sensor is that noise can occur in the sense signal having components which have the same frequency as, but are in phase quadrature with, the component of the excitation signal near the resonant frequency of the resonant circuit. These noise components are not removed by phase sensitive detection and therefore affect the accuracy of the position measurement. Such noise components can be generated through signal coupling between components of the inductive position sensor, either directly or indirectly via a magnetically permeable body which is in close proximity with the inductive position sensor. This problem also arises in inductive position sensors in which a transmit aerial on a first member is directly coupled to a receive aerial, which includes a resonant circuit, on a second member.

SUMMARY OF THE INVENTION

According to a first aspect of the present invention, there is provided an inductive sensor for sensing a parameter, the inductive sensor comprising a magnetic field generator operable to generate a magnetic field, an aerial electromagnetically coupled to the magnetic field generator via a resonant circuit, and a signal processor operable to process the sense signal induced in the aerial. The electromagnetic coupling varies with the sensed parameter so that the sense signal is indicative of the sensed parameter. The magnetic field generator is operable to generate a magnetic field having a first oscillating component at a first frequency, which is operable to induce a resonant signal in the resonant circuit, and a second oscillating component at a second frequency, which is not operable to induce resonance in the resonant circuit. The signal processor is operable determine the value representative of the sensed parameter by processing the sense signal to generate a signal component corresponding to a first component of the sense signal at the first frequency adjusted using a second component of the sense signal at the second frequency in order to reduce noise.

Preferably, the signal processor is operable to perform synchronous detection of the components within the sense signal at the same frequency as, but out of phase with, the first and second components of the excitation signals, and to process these components to form a detection signal from which a value representative of the sensed parameter is derived.

In an embodiment, the magnetic field generator is provided on a first member and the resonant circuit is provided on a second member, with relative movement between the first and second members resulting in a variation between the electromagnetic coupling between the magnetic field generator and the aerial. In this way, the relative position of the first and second members is determined by analysing the sense signal induced in the aerial.

BRIEF DESCRIPTION OF THE DRAWINGS

Various embodiments of the invention will now be described with reference to the attached Figures in which.

DETAILED DESCRIPTION OF THE INVENTION

First Embodiment

Figure 1:
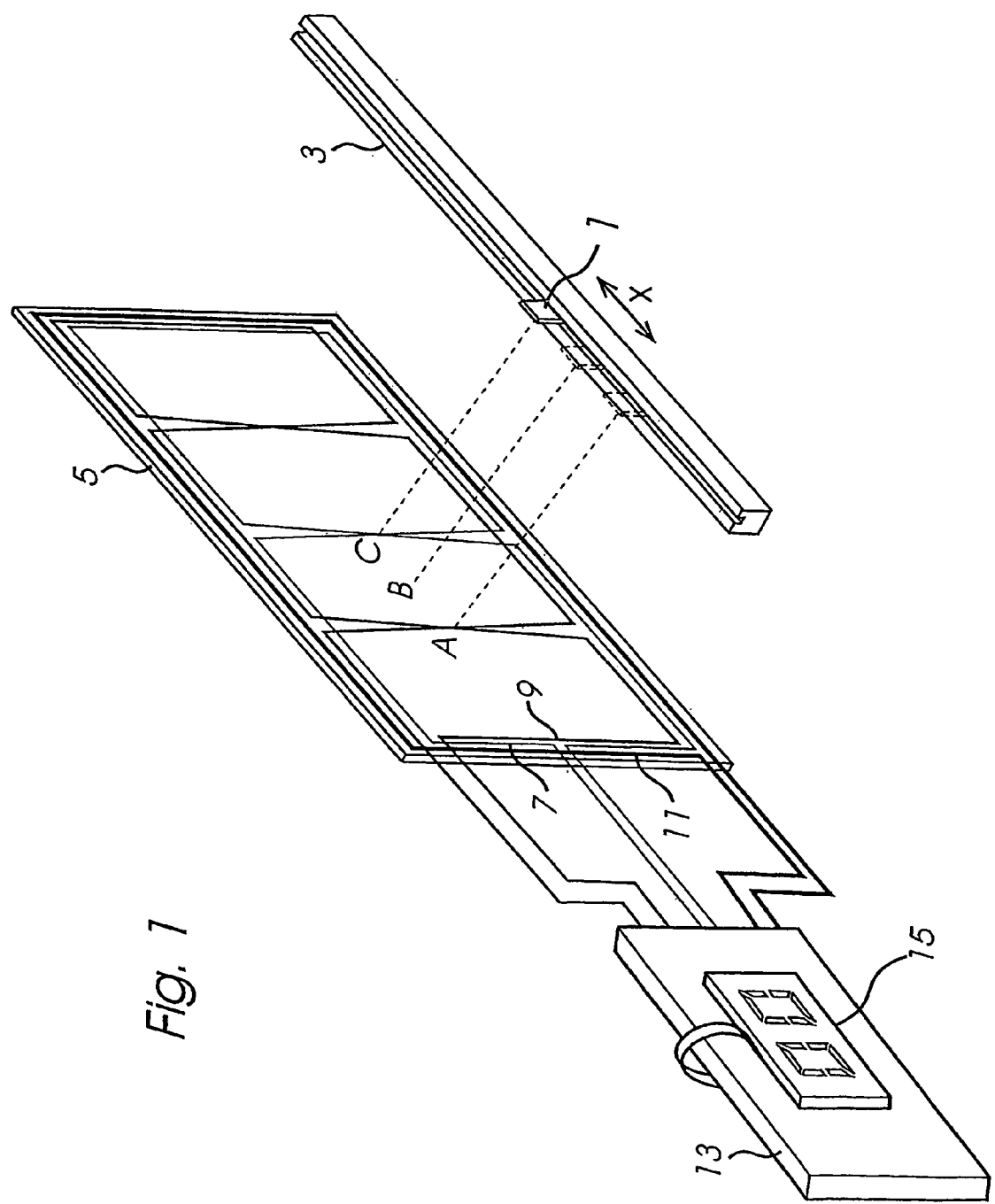
FIG. 1 schematically shows a perspective view of a position sensor according to a first embodiment of the invention, FIG. 2A schematically shows the main components of a sensor element which forms part of the position sensor illustrated in FIG. 1.

FIG. 1 schematically shows a position sensor for detecting the position of a sensor element 1 which is slidably mounted to a support 3 to allow linear movement along a measurement direction (the direction x in FIG. 1). A printed circuit board (PCB) 5 extends along the measurement direction adjacent to the support 3 and has printed thereon conductive tracks which form a sine coil 7, a cosine coil 9 and a sense coil 11, each of which are connected to a control unit 13. A display 15 is also connected to the control unit 13 for displaying a number representative of the position of the sensor element 1 along the support 3.

The layout of the sine coil 7 is such that current flowing through the sine coil 7 generates a first magnetic field having a magnetic field component $B_1$ perpendicular to the PCB 5 which varies along the measurement direction according to one period of the sine function over a distance L. Similarly, the layout of the cosine coil 9 is such that current flowing through the cosine coil 9 generates a second magnetic field having a magnetic field component $B_2$ perpendicular to the PCB 5 which varies along the measurement direction according to one period of the cosine function over the distance L. In particular, in this embodiment the layout of the sine coil 7, the cosine coil 9 and the sense coil 11 on the PCB 5 is identical to the layout of the corresponding coils of the position sensor described in GB 2374424A, whose content is hereby incorporated by reference.

The control unit 13 includes excitation signal generating circuitry (not shown in FIG. 1) for applying excitation signals to the sine coil 7 and the cosine coil 9, and sense signal processing circuitry (not shown in FIG. 1) for processing a sense signal in the sense coil 11. In this way, the sine coil 7 and the cosine coil 9 form a transmit aerial and the sense coil 11 forms a receive aerial. In this embodiment the layout of the sine coil 7, the cosine coil 9 and the sense coil 11 results in the electromotive forces directly induced in the sense coil 11 by current flowing through the sine coil 7 and/or the cosine coil 9 generally balance each other out. In other words, in the absence of the sensor element 1, the sense signal directly generated in the sense coil 11 by current flowing through the sine coil 7 and/or the cosine coil 9 is small. Using the sine coil 7 and the cosine coil 9 for the transmit aerial has the further advantage that the electromagnetic emissions resulting from current flowing through the sine coil 7 and/or the cosine coil 9 diminish with distance at a faster rate than for a single conductive loop. This allows larger drive signals to be used while still satisfying regulatory requirements for electromagnetic emissions.

Figure 2A:
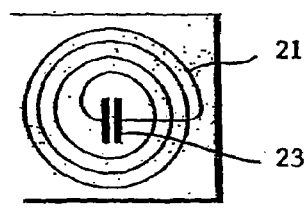
FIG. 2B schematically shows a plot of how the phase of a signal induced in the sensor element illustrated in FIG. 2A varies with the frequency of an applied magnetic field.
FIG. 2C schematically shows a plot of how the magnitude of a signal induced in a sense coil forming part of the position sensor illustrated in FIG. 1 varies with the frequency of an applied magnetic field.

As shown in FIG. 2A, the sensor element 1 includes a coil 21 whose ends are connected together via a capacitor 23. As the coil 21 has an associated inductance, the coil 21 and the capacitor 23 together form a resonant circuit. In this embodiment, the resonant circuit has a nominal resonant frequency $f_{res}$ of 2 MHz, although the actual resonant frequency varies slightly with variations in environmental factors such as temperature and humidity.

When an oscillating excitation signal having a frequency component at or near the resonant frequency of the resonant circuit is applied to the sine coil 7 and the cosine coil 9, an oscillating resonant signal is induced in the resonant circuit. This oscillating resonant signal varies with the position of the sensor element 1 along the measurement direction because the proportions of the resonant signal induced by the sine coil 7 and the cosine coil 9 vary with the position of the sensor element 1. The oscillating resonant signal in turn induces a signal in the sense coil 11, which will hereafter be referred to as the signal component of the sense signal.

Figure 2B:
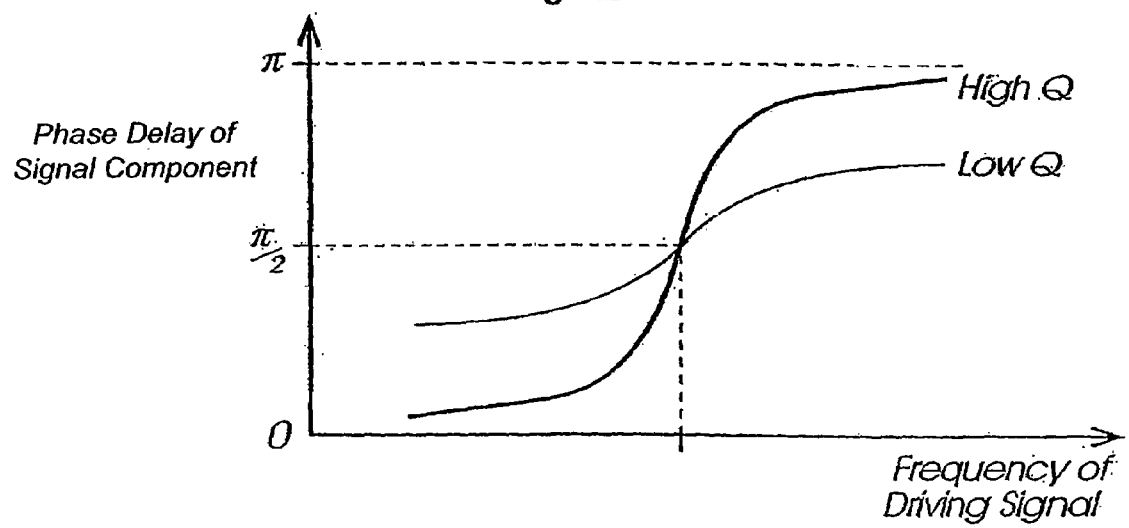

FIG. 2B shows how the phase of the signal component of the sense signal varies with the frequency of the excitation signal. As shown, as the frequency of the excitation signal passes through the resonant frequency $f_{res}$ of the resonant circuit, the phase difference between the signal component of the sensed signal and the excitation signal passes from 0° to 180°, with the phase difference being 90° at the resonant frequency.

Figure 2C:
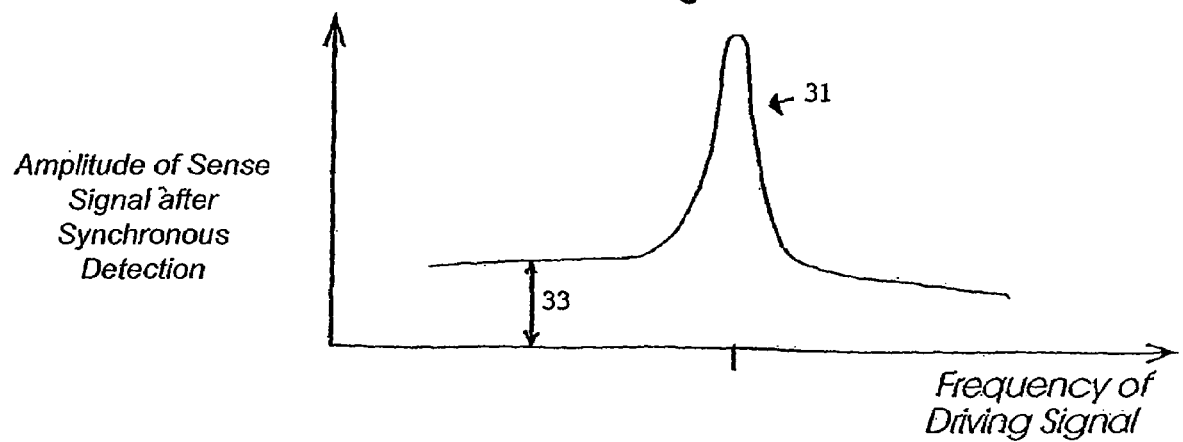

The sense signal induced in the sense coil also includes noise formed by signal coupling between components of the position sensor, either directly (for example the signals directly induced in the sense coil 11 by current flowing through the sine coil 7 and the cosine coil 9) or indirectly via a body other than the resonant circuit of the sensor element 1. As such, the noise is a systematic error signal. Even after synchronous detection, this noise results in a noise component in the detected signal. FIG. 2C schematically shows the variation in the magnitude of the sense signal after synchronous detection with the frequency of the excitation signal. In FIG. 2C, the noise component forms a background noise level 33 which is substantially constant over the illustrated frequency range, and the signal component of the sense signal forms a peak 31 above the background noise level 33 which is centred at the resonant frequency $f_{res}$.

According to the present invention, the excitation signal generated by excitation signal generating circuitry has a first frequency component at a frequency $f_1$ at or near the resonant frequency $f_{res}$ of the resonant circuit and a second frequency component at a second frequency $f_2$ away from the resonant frequency $f_{res}$. The sense signal processing circuitry synchronously detects the amplitude of components of the sense signal at the first frequency $f_1$ and the second frequency $f_2$. The amplitude of the component at the second frequency $f_2$ provides a measure of the noise level, and the sense signal processing circuitry uses the measure of the noise level to adjust the detected component at the first frequency $f_1$ to improve the signal to noise ratio.

Figure 3:
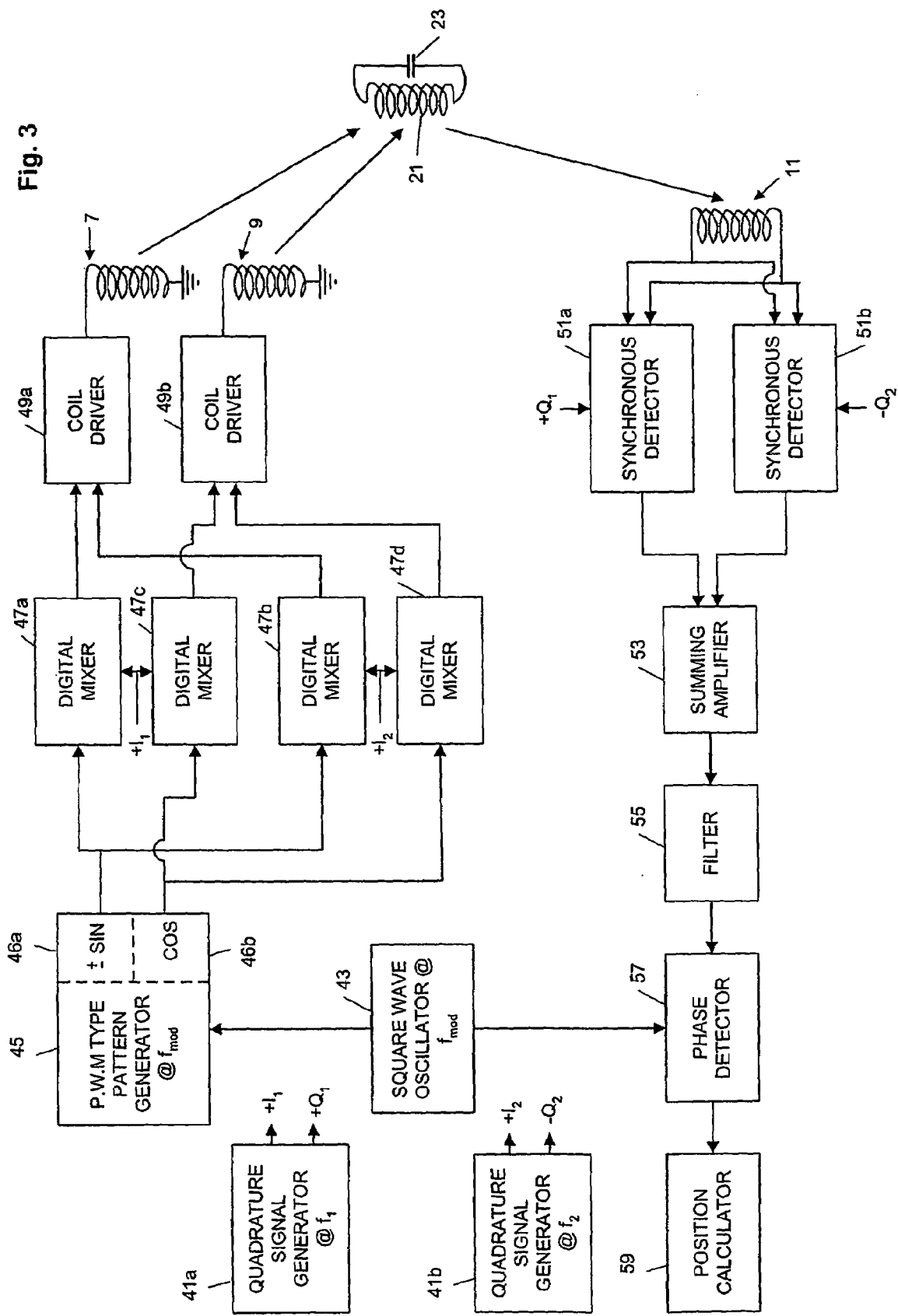
FIG. 3 schematically shows the main signal generating and processing circuitry of the position sensor illustrated in FIG. 1.

The excitation signal generating circuitry and the sense signal processing circuitry will now be described in more detail with reference to FIG. 3. As shown in FIG. 3, the excitation signal generating circuitry includes a first quadrature signal generator 41a which generates an in-phase signal $I_1$ and a quadrature signal $Q_1$ at the first frequency $f_1$, which in this embodiment is 2 MHz (i.e. approximately equal to the nominal resonant frequency $f_{res}$ of the resonant circuit of the sensor element 1). The excitation signal generating circuitry also includes a second quadrature signal generator 41b which generates an in-phase signal $I_2$ and an inverted quadrature signal $-Q_2$ at the second frequency $f_2$, which in this embodiment is 1 MHz which is sufficiently far away from the nominal resonant frequency $f_{res}$ that a signal at the second frequency $f_2$ does not induce resonance in the resonant circuit.

Figure 4:
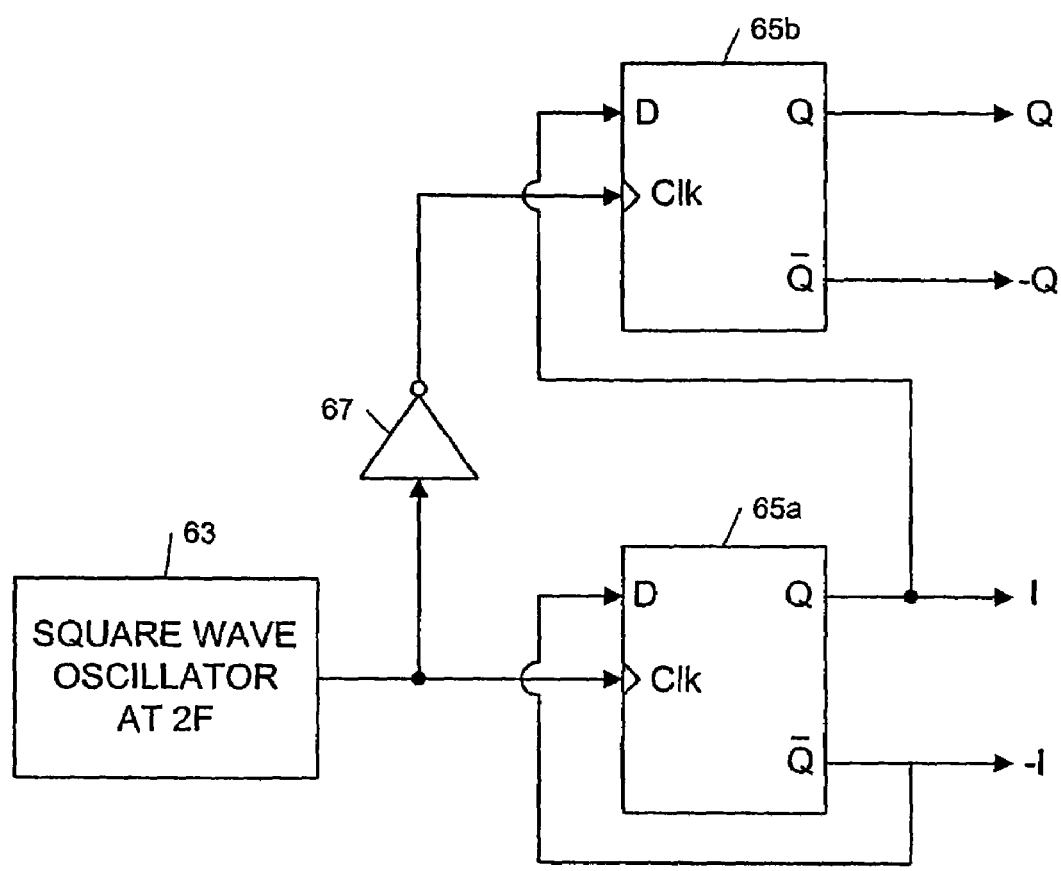
FIG. 4 schematically shows in more detail the form of a quadrature signal generator of the signal generating and processing circuitry illustrated in FIG. 3.

FIG. 4 shows the main components of a quadrature signal generator 41. As shown in FIG. 4, each quadrature signal generator 41 is formed by a conventional arrangement in which the output of a square wave oscillator 63 is input to the clock input of a first D-type flip-flop 65a, with the inverting output of the first D-type flip-flop being connected to the input of the first D-type flip-flop 65a to form a divide-by-two circuit. The output of the square wave oscillator 63 is also input, via an inverter 67, to the clock input of a second D-type flip-flop 65b, with the non-inverting output of the first D-type flip-flop 65a being connected to the input of the second D-type flip-flop 65b. In this way, the non-inverting output of the second D-type flip-flop outputs a signal Q which is phase quadrature with the signal I output by the non-inverting output of the first D-type flip-flop 65a.

Returning to FIG. 3, the excitation signal generating circuitry also includes a square wave oscillator 43 which generates a modulation square wave signal at a frequency $f_{mod}$ of 2.5 kHz. The modulation square wave signal is input to a pulse width modulation (PWM) type pattern generator 45 which generates digital data streams, clocked at 2 MHz, representative of sinusoidal signals at the modulation frequency $f_{mod}$. In particular, the PWM type pattern generator 45 has two outputs 46a, 46b with the first output 46a outputting either a signal +SIN representative of a sine signal at $f_{mod}$ or a signal −SIN representative of an inverted sine signal at $f_{mod}$, and the second output 46b outputting a signal COS which is representative of a cosine signal at $f_{mod}$.

The sine signal ±SIN output by the first output 46a of the PWM type pattern generator 45 is applied to a first digital mixer 47a and a second digital mixer 47b, and the cosine signal COS output by the second output 46b of the PWM type pattern generator 45 is applied to a third digital mixer 47c and a fourth digital mixer 47d. The first digital mixer 47a and the third digital mixer 47c mix the sine signal ±SIN and the cosine signal COS respectively with the in-phase carrier signal $I_1$ at the first frequency $f_1$. Similarly, the second digital mixer 47b and the fourth digital mixer 47d respectively mix the sine signal ±SIN and the cosine COS with the in-phase carrier signal $I_2$ at the second frequency $f_2$. In this embodiment, each digital mixer 47 is formed by a NOR gate.

The outputs of the first digital mixer 47a and the second digital mixer 47b are input to a first coil driver 49a which adds and amplifies the outputs to form a drive signal which is applied to the sine coil 7. The drive signal applied to the sine coil 7 therefore has a term I(t) of the form:

$$I(t) = A \sin 2\pi f_{mod} t (\sin 2\pi f_1 t + \sin 2\pi f_2 t)$$

where A is a constant.

The outputs of the third digital mixer 47c and the fourth digital mixer 47d are input to a second coil driver 49b, which adds and amplifies the outputs to form a drive signal which is applied to the cosine coil 9. The drive signal applied to the cosine coil 9 therefore has a term Q(t) of the form:

$$Q(t) = A \cos 2\pi f_{mod} t (\sin 2\pi f_1 t + \sin 2\pi f_2 t)$$

Figure 5:
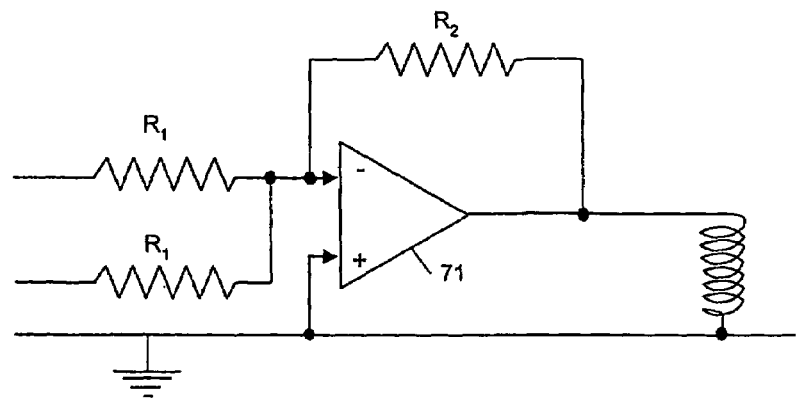
FIG. 5 schematically shows in more detail a coil driver of the signal generating and processing circuitry illustrated in FIG. 3.

FIG. 5 shows the main components of each coil driver 49. As shown, the signals output by the corresponding digital mixers 47 are input, via respective resistors having resistance $R_1$, to the inverting input of an operational amplifier 71. The non-inverting input of the operational amplifier 71 is connected to ground, and a resistor having a resistance $R_2$ is connected between the inverting input of the operational amplifier 71 and the output of the operational amplifier 71 so that the operational amplifier 71 acts as an inverting amplifier. The coil being driven is connected between the output of the operational amplifier 71 and ground.

The magnetic fields generated by the drive signals flowing through the sine coil 7 and the cosine coil 9 induce a sense signal S(t) in the sense coil 11 of the form:

$$S(t) \alpha \left[ C \cos\left(2\pi f_{mod} t - \frac{2\pi X}{L}\right) + \xi_1(t) \right] \cos 2\pi f_1 t +$$
$$\xi_2(t) \cos 2\pi f_2 t + \text{other terms}$$

where C is a constant, X is the position of the sensor element 1 relative to the PCB 5 along the X-direction, $\xi_1(t)$ and $\xi_2(t)$ are the amplitudes of the part of the noise component in phase quadrature with the components of the drive signals at the first frequency $f_1$ and the second frequency $f_2$ respectively. The other terms relate to terms at frequencies away from $f_1$ and $f_2$ and terms at the frequencies $f_1$ and $f_2$ which are in phase with the components of the drive signals at $f_1$ and $f_2$. The noise component amplitudes $\xi_1(t)$ and $\xi_2(t)$ at the modulation frequency $f_{mod}$ and frequencies which are comparatively slow with respect to the modulation frequency $f_{mod}$, due to changes in environmental factors such as movement of a nearby conductive object.

The sense signal S(t) is input to a first synchronous detector 51a together with the quadrature signal $Q_1$ at the first frequency $f_1$. The first synchronous detector 51a performs synchronous detection of the sense signal S(t) using the quadrature signal $Q_1$ as the reference signal to generate a first detection signal $D_1(t)$ having the form:

$$D_1(t) = C \cos\left(2\pi f_{mod} t - \frac{2\pi X}{L}\right) + \xi_1(t)$$

The sense signal S(t) is also input to a second synchronous detector 51b together with the inverse quadrature signal $-Q_2$ at the second frequency $f_2$. The second synchronous detector 51b performs synchronous detection of the sense signal S(t) using the inverse quadrature signal $-Q_2$ as the reference signal to generate a second detection signal $D_2(t)$ of the form:

$$D_2(t) = -\xi_2(t)$$

Figure 6:
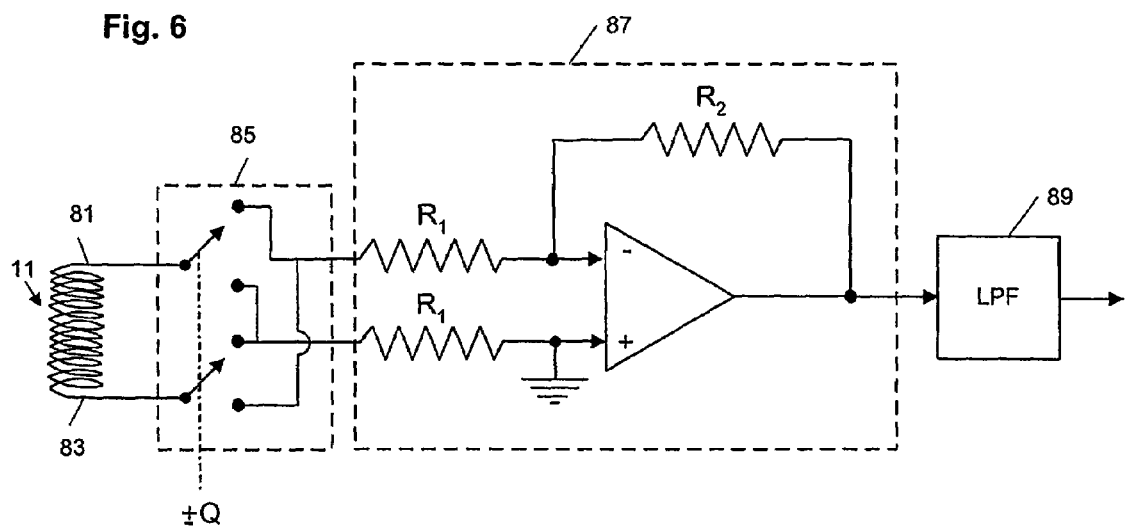
FIG. 6 schematically shows in more detail a synchronous detector of the signal generating and processing circuitry illustrated in FIG. 3.

FIG. 6 shows the sense coil 11 and the main components of one of the synchronous detectors 51. As shown, a first end 81 and a second end 83 of the sense coil 11 are connected to respective inputs of a switching arrangement 85, which multiplies the sense signal by the input reference signal (i.e. the quadrature signal $Q_1$ for the first synchronous detector 51a and the inverse quadrature signal $-Q_2$ for the second synchronous detector 51b). The two outputs of the switching arrangement 85 are connected to respective inputs of a differential amplifier 87, and the output of the differential amplifier 87 is passed through a low pass filter 89 which removes frequency components which are above the modulation frequency $f_{mod}$.

Returning to FIG. 3, the first detection signal $D_1(t)$ and the second detection signal $D_2(t)$ are then input to a summing amplifier 53, which adds the first detection signal $D_1(t)$ and second detection signal $D_2(t)$ together. In this embodiment it is assumed, for ease of explanation, that the noise components $\xi_1(t)$ and $\xi_2(t)$ are so similar in magnitude that when the first detection signal $D_1(t)$ and the second detection signal $D_2(t)$ are added together the noise components $\xi_1(t)$ and $\xi_2(t)$ cancel each other out. The summed signal output by the summing amplifier 53 is then input to a bandpass filter 55 centred on the modulation frequency $f_{mod}$. The filtered signal F(t) output by the filter 55 is of the form:

$$F(t)\alpha\cos\left(2\pi f_{mod}t - \frac{2\pi X}{L}\right)$$

The filtered signal F(t) is therefore an oscillating signal at the modulation frequency $f_{mod}$ whose phase varies with the relative position of the sensor element 1 and the PCB 5.

The filtered signal F(t) is input to a phase detector 57 which measures the phase difference between the filtered signal F(t) and the square wave modulation signal output by the square wave oscillator 43, and outputs a signal indicative of the measured phase difference to a position calculator 59 which calculates the position of the sensor element 1 relative to the PCB 5 using the measured phase difference.

The modulation of the signal at the first frequency $f_1$ by the +SIN signal and the COS signal, any difference between the first frequency $f_1$ and the actual resonant frequency of the resonant circuit, the low pass filter 89 of the synchronous detector 51 and the filter 55 introduce a phase shift $\Delta_F$ in the filtered signal F(t) which needs to be corrected for in order to obtain high accuracy position measurement. In this embodiment, this correction is performed by the PWM type pattern generator 45 alternately outputting the +SIN signal and the –SIN signal and the position calculator 59 averaging the resultant measured phase differences, in the same manner as described in GB 2374424A.

Second Embodiment

In the first embodiment, the amplitude of the noise components $\xi_1(t)$ and $\xi_2(t)$ at the frequencies $f_1$ and $f_2$ respectively are assumed to be equal. In practice, however, there will be a variation in the amplitude of the noise component $\xi(t)$ with frequency, although the variation of the noise component $\xi(t)$ with frequency is slower than the variation with frequency of the amplitude of the signal component resulting from resonance in the resonant circuit of the sensor element 1. Nevertheless, the arrangements described in the first embodiment do give a reduction in noise, and therefore an improvement in the accuracy of position measurement.

Figure 7:
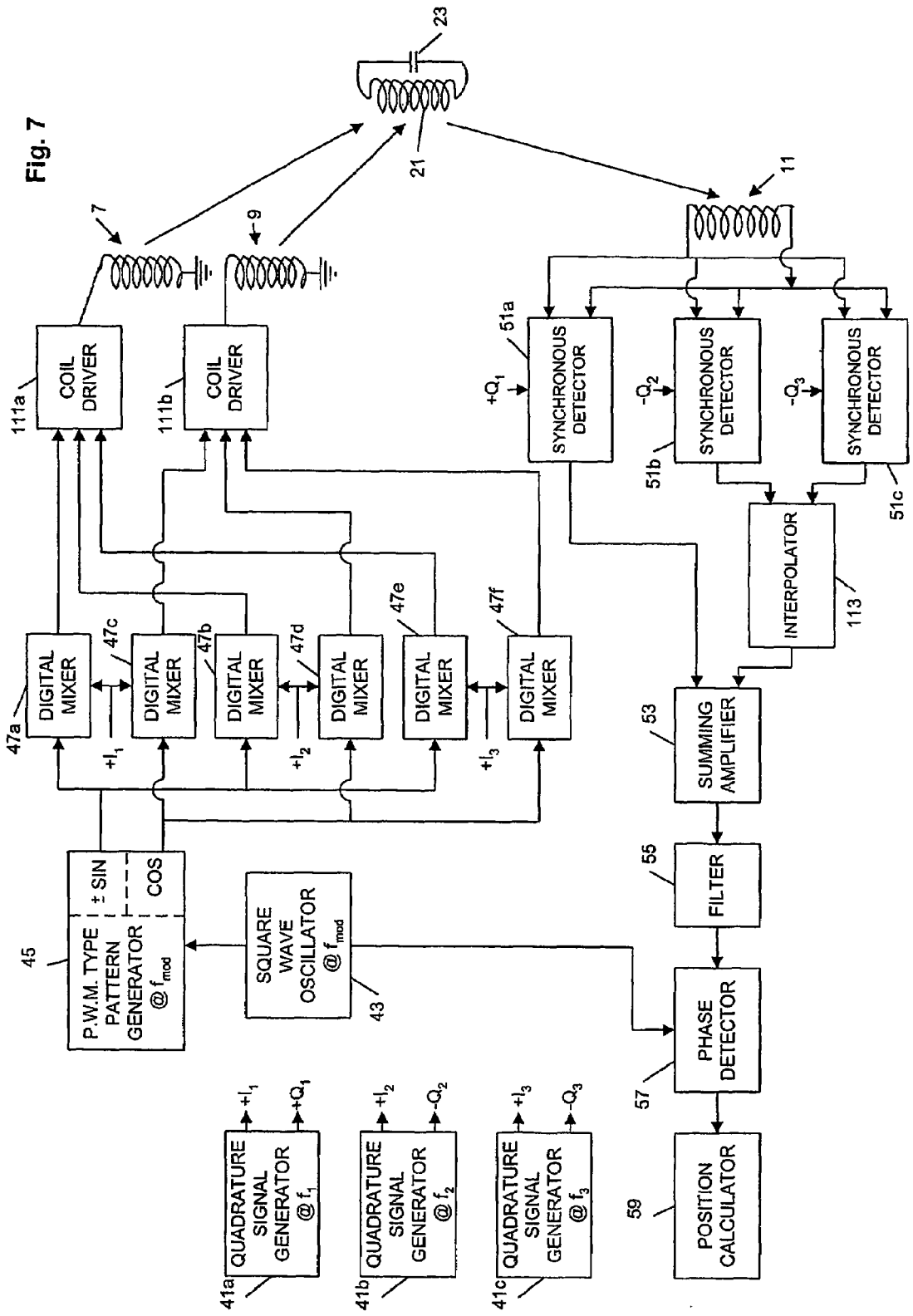
FIG. 7 schematically shows the main signal generating and processing circuitry of a position sensor according to a second embodiment of the invention.

A second embodiment will now be described with reference to FIG. 7 in which, in order to achieve a more accurate estimate of the noise component $\xi_1(t)$ at the first frequency $f_1$, the excitation signal generating circuitry generates components of the excitation signal at two frequencies away from the resonant frequency $f_{res}$, and the sense signal processing circuitry measures the strength of the noise components at these frequencies and interpolates the noise component $\xi_1(t)$ at the first frequency $f_1$. In FIG. 7, components which are identical with corresponding components of the first embodiment have been referenced by the same numerals and will not be described in detail again.

Figure 8:
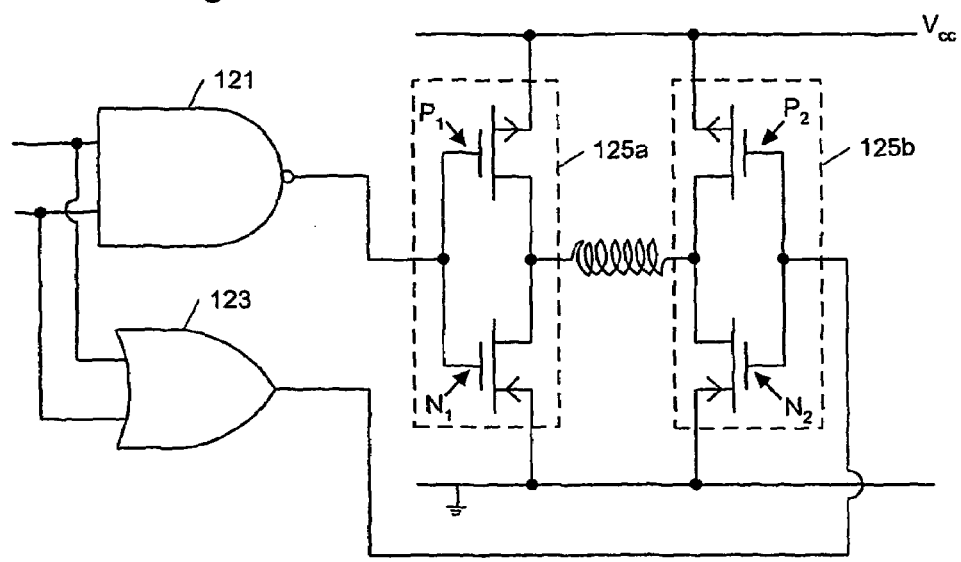
FIG. 8 schematically shows the main components of an alternative coil driver to the coil driver illustrated in FIG. 5.

As shown in FIG. 8, in this embodiment a third quadrature signal generator 41c generates an in-phase signal $I_3$ and an inverse quadrature signal $-Q_3$ at a third frequency $f_3$, which does not induce resonance in the resonant circuit. In this embodiment, the third frequency $f_3$ is 3 MHz so that the second and third frequencies are evenly spaced on either side of the first frequency $f_1$. The in-phase signal $I_3$ is input to a fifth digital mixer 47e together with the sine signal ±SIN output by the first output 46a of the PWM type pattern generator 45, and the resultant output of the fifth digital mixer 47e is input to a first coil driver 111a together with the outputs of the first digital mixer 47a and the second digital mixer 47b. Similarly, the in-phase signal $I_3$ is input to a sixth digital mixer 47f together with the cosine signal COS output by the second output 46b of the PWM type pattern generator 45, and the resultant output of the sixth digital mixer 47f is input to a second coil driver 111b together with the outputs of the third digital mixer 47c and the fourth digital mixer 47d.

Each of the first and second coil drivers 111 is similar to the coil drivers 49 of the first embodiment, as shown in FIG. 5, but with three input signals instead of two being directed to the non-inverting input of the operational amplifier via respective resistors. The output of the first coil driver 111a drives the sine coil 7, and the output of the second coil driver 111b drives the cosine coil 9.

The sense signal S(t) induced in the sense coil 11 is input to: i) a first synchronous detector 51a together with the quadrature signal $Q_1$ at the first frequency $f_1$; ii) a second synchronous detector 51b together with the inverse quadrature signal $-Q_2$ at the second frequency $f_2$; and iii) a third synchronous detector together with the inverse quadrature signal $-Q_3$ at the third frequency $f_3$. The outputs of the second synchronous detector 51b and the third synchronous detector 51c, which are respectively representative of the noise component $\xi_2(t)$ at the second frequency and the nose component $\xi_3(t)$ at the third frequency, are input to an interpolator 153 which derives a value for the noise component $\xi_1(t)$ at the first frequency $f_1$. In this embodiment, the interpolator 153 performs a linear interpolation by averaging the magnitudes of the signals output by the second synchronous detector 51b and the third synchronous detector 51c.

The signal output by the interpolator is input to a summing amplifier 53 together with the output of the first synchronous detector 51a, and the sense signal processing then proceeds in the same manner as the first embodiment.

Modifications and Further Embodiments

In the second embodiment, the interpolator 153 performs a linear interpolation of the noise component at the carrier frequency near the resonant frequency $f_{res}$ using the noise components at two frequencies which do not induce resonance in the resonant circuit. It will be appreciated that the excitation signals applied to the sine coil 7 and the cosine coil 9 could include components at more than two frequencies which do not induce resonance in the resonant circuit, with the noise components at these frequencies being measured by respective synchronous detectors and input to an interpolator. Further, the interpolator 153 could perform the interpolation in accordance with a more complicated function which more closely matches the variation of the noise component $\xi(t)$ with frequency.

In the first embodiment, as shown in FIG. 5 the coil driver 49 includes a summing amplifier which performs an analogue summation of the two input signals. FIG. 8 shows an alternative coil driver to the coil driver used in the first embodiment. As shown, the two input signals are input to a NAND gate 121 and an OR gate 123. The coil driver comprises a first amplification circuit 125a and a second amplification circuit 125b which are connected in parallel between the supply voltage $V_{cc}$ and ground. The first amplification circuit 125a comprises a p-channel MOSFET switch P1 and an n-channel MOSFET switch N1 with the drain of P1 connected to the drain of N1 and the gates of P1 and N1 connected to each other. The signal output by the NAND gate 121 is input to an input terminal located at the common gate of P1 and N1. Similarly, the second amplification circuit 125b is formed in an identical manner to the first amplification circuit 125a using a p-channel MOSFET switch P2 and an n-channel MOSFET switch N2 and the output of the OR gate 123 is applied to an input terminal located at the common gate of P2 and N2. The coil being driven is connected between an output terminal of the first amplification circuit 125a located at the connection between the drain of P1 and the drain of N1 and an output terminal of the second amplification circuit 125b located at the connection between the drain of P2 and the drain of N2.

In this way, if the signals input to the NAND gate 121 and the OR gate 123 are both at the LOW level, current flows in a first direction through the coil being driven; if the signals input to the NAND gate 121 and the OR gate 123 are both in a HIGH level, then current flows through the coil being driven in a second direction which is opposite to the first direction. If one of the signals input to the NAND gate 121 and the OR gate 123 is in a HIGH level and the other signal is in a LO level, then no current flows thought the coil being driven. In this way, digital switching allows three different states of driving of the coil being driven and therefore summation using digital signals is possible.

Figure 9:
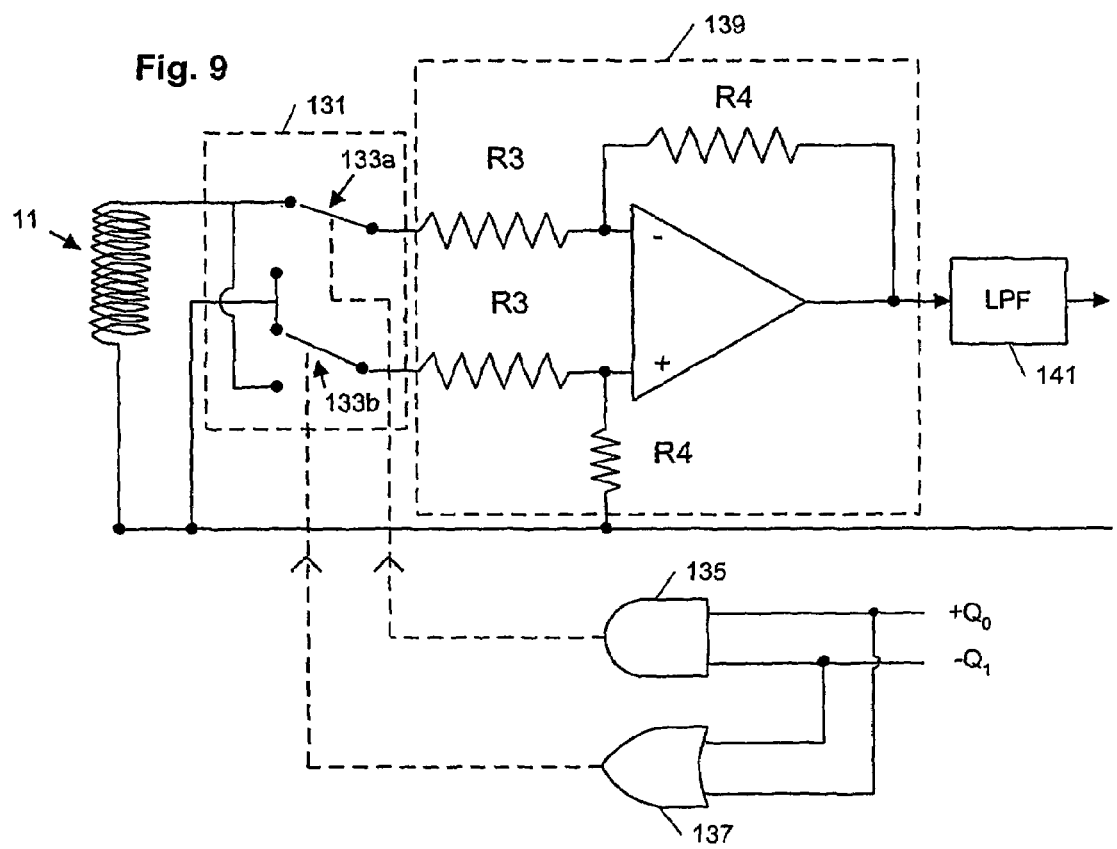
FIG. 9 schematically shows the main components of an alternative synchronous detector to the synchronous detector illustrated in FIG. 6.

In the first embodiment, separate synchronous detectors are used to detect the signal components at the frequencies $f_1$ and $f_2$. However, a single synchronous detection operation may be performed by multiplying the sense signal by a reference signal having frequency components at $f_1$ and $f_2$. FIG. 9 shows a synchronous detector implementing such an arrangement, together with the sense coil 11. As shown, the sense coil 11 is connected to a switching arrangement 131 having two independently controlled signal-pole signal-throw switches 133a and 133b. Each of the switches 133 has two input terminals connected to respective ends of the sense coil 11. The control signal for the switches 133 are generated by inputting the quadrature signal $Q_1$ at $f_1$ and the inverse quadrature signal $-Q_2$ to an AND gate 135 and an OR gate 137. The output of the AND gate 135 is connected to the first switch 133a and the output of the OR gate 137 is connected to the second switch 133b.

The output terminals of each switch 13 is connected to a respective input of a differential amplifier 139, and the output of the differential amplifier is input to a low pass filter 141 which removes frequency components above the modulation frequency $f_{mod}$.

In the described embodiments, a transmit aerial is formed by two excitation windings and a receive aerial is formed by a single sensor winding. It will be appreciated that many other arrangements of transmit aerial and receive aerial in which the electromagnetic coupling between the transmit aerial and the receive aerial varies along a measurement path could be used. For example, the transmit aerial could be formed by a single excitation winding and the receive aerial could be formed by a pair of sensor windings, with the respective strengths of signals induced in the two sensor windings being indicative of the location of the sensor element. In such an arrangement, the sense signal induced in each sensor winding is adjusted using a noise component at a frequency away from the resonant frequency in order to reduce noise.

It will also be appreciated that the position sensor described in the first embodiment could be adapted to measure a linear position along a curved line, for example a circle (i.e. a rotary position sensor) by varying the layout of the sine coil and the cosine coil in a manner which would be apparent to persons skilled in the art. The position sensor could also be used to detect speed by periodically detecting the position of the sensor element as the sensor element moves along the measurement path, and then calculating the rate of change of position.

As described in the first embodiment, the phase shift $\Delta_F$ introduced in the filtered signal F(t) is removed by effectively taking two measurements of the position with the phase of the signal applied to the sine coil 7 being reversed between measurements. It will be appreciated that in alternative embodiments, the reverse measurement need only be performed intermittently to determine a value for the phase shift $\Delta_F$ which has the advantage of increasing the measurement update rate. Alternatively, a predetermined value for the phase shift $\Delta_F$, determined by a factory calibration, could be subtracted from a single phase measurement. However, this is not preferred because it cannot allow for environmental factors which affect the resonant frequency $f_{res}$ and quality factor of the resonant circuit and therefore vary the phase shift $\Delta_F$.

It will be appreciated that if the phase angle measured using the −SIN signal is subtracted from, rather than added to, the phase angle measured using the +SIN signal then the position-dependent phase shift would be removed to leave a value equal to twice the phase shift $\Delta_F$. In an embodiment, the resonant circuit is manufactured using components having a high sensitivity to environmental factors so that the variation of resonant frequency with environmental factors is the dominant cause of the phase shift $\Delta_F$. In this way, a measurement of the phase shift $\Delta_F$ can be indicative of an environmental factor, for example temperature in a constant humidity environment or humidity in a constant temperature environment. Typically, this would involve storing in the control circuitry of the inductive sensor a factory calibration between the measured phase shift $\Delta_F$ and the corresponding value of the environmental factor.

In the described embodiments, the sine coil 7 and the cosine coil 9 are arranged so that their relative contributions to the total magnetic field component perpendicular to the PCB 5 vary in accordance with position along the measurement direction. In particular, the sine and cosine coils have an alternate twisted loop structure. However, it would be apparent to a person skilled in the art that an enormous variety of different excitation winding geometries could be employed to form transmit aerials which achieve the objective of causing the relative proportions of the first and second transmit signals appearing in the ultimately detected combined signal to depend upon the position of the sensor element in the measurement direction.

While in the described embodiments, the excitation windings are formed by conductive tracks on a printed circuit board, they could also be provided on a different planar substrate or, if sufficiently rigid, could even be free standing. Further, it is not essential that the excitation windings are planar because, for example, cylindrical windings could also be used with the sensor element moving along the cylindrical axis of the cylindrical winding.

If the inductive sensor is used to measure only an environmental factor such as temperature or humidity, only one transmit aerial could be used as there is no requirement for the phase of the magnetic field to vary with position.

In the first embodiment, the modulating signals are described as digital representations of sinusoidal signals. This is not strictly necessary and it is often convenient to use modulating signals that can be more easily generated using simple electronics. For example, the modulating signals could be digital representations of triangular waveforms. The phase of the modulation can be decoded in the usual way by only looking at the fundamental frequency of the modulated signals, i.e. by filtering out the higher harmonics present in the triangular waveform. Note that some filtering will be performed as a result of the physical and electrical properties of, and the electromagnetic coupling between, the transmit and receive aerials. Alternatively, if no filtering is used, the zero crossing point of the demodulated waveform will still vary with the target position in some predictable, albeit non-linear, manner which could be converted to a linear measurement of position by using look-up table or a similar technique.

In the first and second embodiments, a quadrature pair of modulation signals are applied to carrier signals to generate first and second excitation signals which are applied to the sine coil 7 and cosine coil 9 respectively. However, the use of a quadrature pair of modulation signals is not essential because it is merely required that the information carrying components of the excitation signals are distinct in some way so that the relative contributions from the first and second excitation signals can be derived by processing the combined signal. For example, the modulation signals could have the same frequency and a phase which differs by an amount other than 90 degrees. Alternatively, the modulation signals could have slightly different frequencies thus giving rise to a continuously varying phase difference between the two signals.

In the above described embodiment, a passive resonator is used. However, in some circumstances it may be advantageous to use a powered resonator so that the signal induced in the resonator is considerably amplified, thus reducing the requirements on the signal processing circuitry.

Instead of detecting the phase of the information carrying components of the combined signal, it is also possible to perform parallel synchronous detection of the combined signal, one synchronous detection using an in-phase modulation signal and the other synchronous detection using a quadrature modulation signal, and then to perform an arctangent operation on the ratio of the detected magnitudes of the demodulated signals. In such an embodiment, by using excitation signals which comprise a carrier frequency signal and a modulation signal so that the modulation signals can have a relatively low frequency, the detection of the magnitude of the modulation signals and the ensuing arctangent calculation (or reference to a look-up table) can be performed in the digital domain after down-conversion from the carrier frequency. An alternative method of detection of the information carrying part of the signal after down-conversion from the carrier frequency signal to baseband would be to perform a fast Fourier transform detection. As will be appreciated, this could be done either using some additional specialised dedicated hardware (e.g. an application specific integrated circuit) or by suitably programming the microprocessor. Such a method of detection would be particularly convenient in an arrangement in which more than one degree of freedom of movement of a target is to be detected.

Although synchronous detection is preferred because the phase sensitive nature of the synchronous detection removes noise, alternatively a filtering arrangement could be used to isolate the signals at each carrier frequency. For example, the sense signal induced in the sense coil could be input to a parallel arrangement of bandpass filters, with each bandpass filter centred at a respective different carrier frequency. The signal strengths at each frequency can then be compared in order to determine the noise component at the carrier frequency close to the resonant frequency $f_{res}$.

In the above described embodiment, the measurement path extends only over a single period of the spatial variation of the two transmit coils (i.e. the sine coil 7 and the cosine coil 9). However, this need not be the case and the measurement path could extend over more or less than a single period of the spatial variation of the transmit coils. In such a case, it is preferable to include a mechanism for resolving period ambiguity (i.e. the fact that the basic phase of the information carrying component of the combined signal will be identical for the same corresponding position in different spatial periods of the transmit coils). Mechanisms for overcoming spatial period ambiguity which can be employed include providing a single reference position detected, for example, by a single location position sensor (e.g. by having a single localised transmit coil transmitting a third transmit signal at a different modulation frequency to add with the first and second transmit aerials, or by using an opto-switch) and thereafter counting the periods from the reference position, and maintaining a record in a register within the microprocessor of the particular period within which the sensor element is currently located. Alternatively, an additional set of transmit coils transmitting at a different modulation frequency (or transmitting in a time multiplexed manner), could be used with either a slightly varying spatial frequency to provide a Vernier scale effect, or with a widely varying spatial frequency to provide coarse position detection using a large scale set of transmit coils and fine scale position detection using small scale transmission coils.

In the described embodiment, a modulation frequency of 2.5 kHz is used because it is well suited to digital processing techniques. This generally applies to frequencies in the range 100 Hz to 100 kHz. Preferably, frequencies in the range of 1–10 kHz are used, for example 3.9 kHz or 5 kHz.

Although in the first embodiment the PWM type pattern generator is clocked at 2 MHz, other clocking frequencies could be used. Further, the clocking frequency need not be equal to one of the carrier frequencies.

In the described embodiment, a carrier frequency of 2 MHz is used. Using a carrier frequency above 1 MHz facilitates making the sensor element small. However, in some applications it may be desirable to use a carrier frequency below 100 kHz, for example if a sheet of non-magnetic stainless steel separates the sensor element from the excitation and sensor windings, because the skin depth of the non-magnetic stainless steel is greater at lower frequencies.

The invention claimed is:

1. An inductive sensor for sensing a parameter, the inductive sensor comprising:
 a magnetic field generator operable to generate a magnetic field;
 a receive aerial electromagnetically coupled to the magnetic field generator via a resonant circuit, said electromagnetic coupling being variable in dependence on the sensed parameter so that a sense signal induced in the receive aerial in response to a magnetic field generated by the magnetic field generator is representative of the sensed parameter, wherein the magnetic field generator is operable to generate a magnetic field comprising a first magnetic field component at a first frequency which is operable to induce resonance in the resonant circuit and a second magnetic field component at a second frequency which is not operable to induce resonance in the resonant circuit; and a signal processor operable to process the sense signal to generate a signal component corresponding to a first component of the sense signal at said first frequency adjusted using a second component of the sense signal at the second frequency, and to determine a value representative of the sensed parameter using the signal component.

2. An inductive sensor according to claim 1, wherein the signal processor comprises:
a first synchronous detector operable to detect the first component of the sense signal;
a second synchronous detector operable to detect the second component of the sense signal; and
a combiner operable to combine the first and second components of the sense signal to generate the signal component.

3. An inductive sensor according to claim 1, wherein the signal processor comprises:
a reference signal generator operable to generate a reference signal having frequency components at the first and second frequencies; and
a synchronous detector operable to detect the signal component using the reference signal generated by the reference signal generator.

4. An inductive sensor according to claim 1, wherein the magnetic field generator is operable to generate a magnetic field including magnetic field components at a plurality of different frequencies which are not operable to induce resonance in the resonant circuit,
wherein the signal processor is operable to generate the signal component using components of the sense signal at said plurality of different frequencies which do not induce resonance.

5. An inductive sensor according to claim 4, wherein the signal processor comprises:
an interpolator operable to interpolate a noise component at the first frequency using the components of the sense signal at said plurality of different frequencies which do not induce resonance; and
a signal adjuster operable to adjust said first component of the sense signal in accordance with the interpolated noise component.

6. An inductive sensor according to claim 1, wherein the magnetic field generator comprises:
a transmit aerial; and
a signal generator operable to apply an excitation signal to the transmit aerial in order to generate said magnetic field.

7. An inductive sensor according to claim 6, wherein the transmit aerial comprises conductive track on a planar substrate.

8. An inductive sensor according to claim 7, wherein the planar substrate is a printed circuit board.

9. An inductive sensor according to claim 6, wherein the transmit aerial comprises first and second excitation windings and the receive aerial comprises a sensor winding,
wherein the electromagnetic coupling between the first and second excitation windings and the sensor winding varies along a path in accordance with respective different functions.

10. An inductive sensor according to claim 9, wherein the signal processor comprises a phase detector operable to measure the phase of said signal component.

11. An inductive sensor according to claim 1, wherein said magnetic field generator is operable to induce a resonant signal in the resonant circuit, which in turn is operable to induce an electromotive force in the receive aerial.

12. An inductive sensor according to claim 6, wherein the transmit aerial and the receive aerial are fixed relative to a first member and the resonant circuit is fixed relative to a second member,
wherein at least one of the first and second members is movable relative to the other of the first and second members, and
wherein the electromagnetic coupling between the transmit aerial and the receive aerial varies in response to relative movement between the first and second members,
and wherein the signal processor is operable to determine a value representative of the relative position of the first and second members.

13. An inductive sensor according to claim 1, wherein the receive aerial comprises the resonant circuit.

14. An inductive sensor according to claim 6, wherein the transmit aerial is fixed relative to a first member and the receive aerial is fixed relative to a second member,
wherein at least one of the first and second members is movable relative to the other of the first and second members, and
wherein the electromagnetic coupling between the transmit aerial and the receive aerial varies in response to relative movement between the first and second members,
and wherein the signal processor is operable to determine a value representative of the relative position of the first and second members.

15. An inductive sensor for sensing a parameter, the inductive sensor comprising:
a receive aerial electromagnetically coupled to a magnetic field generator via a resonant circuit, said electromagnetic coupling being variable in dependence on the sensed parameter so that a sense signal induced in the receive aerial in response to a magnetic field generated by the magnetic field generator is representative of the sensed parameter, wherein the magnetic field generator is operable to generate a magnetic field comprising a first magnetic field component at a first frequency which is operable to induce resonance in the resonant circuit and a second magnetic field component at a second frequency which is not operable to induce resonance in the resonant circuit; and
a signal processor operable to process the sense signal to generate a signal component corresponding to a first component of the sense signal at said first frequency adjusted using a second component of the sense signal at the second frequency to reduce a noise component of the first component of the sense signal, and to determine a value representative of the sensed parameter using the signal component.

16. An inductive sensing method for sensing a parameter, the method comprising the steps of:
generating a magnetic field comprising a first magnetic field component at a first frequency which is operable to induce resonance in a resonant circuit and a second magnetic field component at a second frequency which is not operable to induce resonance in the resonant circuit; and
processing a sense signal induced in a receive aerial in response to a magnetic field generated by the magnetic field generator, wherein the receive aerial is electromagnetically coupled to the magnetic field via the resonant circuit with said electromagnetic coupling varying in dependence on the sensed parameter so that the sense signal is representative of the sensed parameter, wherein said processing step comprises generating a signal component corresponding to a first component of the sense signal at said first frequency adjusted using a second component of the sense signal at the second frequency, and determining a value representative of the sensed parameter using the signal component.

* * * * *